United States Patent [19]
Hirota et al.

[11] Patent Number: 5,568,390
[45] Date of Patent: Oct. 22, 1996

[54] NAVIGATION SYSTEM TO BE MOUNTED ON VEHICLES

[75] Inventors: Masaharu Hirota, Susono; Toru Ito, Nagoya; Norikazu Endo, Susono; Akihiko Nojima, Toyota; Yoshitaka Kato, Anjo, all of Japan

[73] Assignee: Toyota Jidosha Kabushiki Kaisha, Toyota, Japan

[21] Appl. No.: 580,491

[22] Filed: Dec. 29, 1995

Related U.S. Application Data

[63] Continuation of Ser. No. 288,211, Aug. 9, 1994, abandoned.

[30] Foreign Application Priority Data

Aug. 10, 1993 [JP] Japan .................................. 5-198333

[51] Int. Cl.$^6$ .................................................. G06F 165/00
[52] U.S. Cl. ............................ 364/449; 364/444; 340/990; 340/995
[58] Field of Search ...................................... 364/443, 444, 364/449; 73/178 R; 340/988, 990, 995

[56] References Cited

U.S. PATENT DOCUMENTS

| | | | |
|---|---|---|---|
| 4,926,336 | 5/1990 | Yamada | 340/995 |
| 4,992,947 | 2/1991 | Nimura et al. | 364/449 |
| 5,031,104 | 7/1991 | Ikeda et al. | 340/995 |
| 5,084,822 | 1/1992 | Hayami | 340/990 |
| 5,212,643 | 5/1993 | Yoshida | 340/995 |
| 5,220,507 | 6/1993 | Kirson | 340/995 |
| 5,257,023 | 10/1993 | Furuya | 340/995 |
| 5,272,638 | 12/1993 | Martin et al. | 340/995 |
| 5,291,413 | 3/1994 | Tamai et al. | 364/444 |
| 5,369,588 | 11/1994 | Hayami et al. | 364/449 |

FOREIGN PATENT DOCUMENTS

| | | |
|---|---|---|
| 63-282879 | 11/1988 | Japan . |
| 2129800 | 5/1990 | Japan . |
| 2278116 | 11/1990 | Japan . |
| 4-213761 | 8/1992 | Japan . |
| 6-125357 | 5/1994 | Japan . |

OTHER PUBLICATIONS

Kato et al., "A Study on a Sightseeing Trip Planning System", Proceedings of the 41st Nationalwide Conference of Information Processings Society of Japan, Sep. 4–6, 1990.

Kato et al., "A Sightseeing Route Guide System by Means of Fuzzy Reasoning", Proceedings of the 40th Nationawide Conference of Information Processing Society of Japan, Mar. 14–16, 1990.

Suzuki et al., "A Travel Consultation System: Towards a Smooth Conversation in Japanese", Lecture Notes in Computer Science, vol. 221, 1986, pp. 226–235.

*Primary Examiner*—Gary Chin
*Attorney, Agent, or Firm*—Cushman Darby & Cushman, L.L.P.

[57] ABSTRACT

A navigation system to be mounted on a vehicle for carrying out a route search and displaying the searched route. Traffic jam information and the like are obtained by an beacon receiver and an input part inputs time as a driving condition. An ECU executes a predetermined calculation based on map data of a CD-ROM and traffic jam data and to obtain a range and routes reachable within the input time and to display the same. In case of residual fuel as a condition, the reachable range by this fuel is displayed. A display of gasoline stands as information for expanding reachability is also executed. Hence, a driver can plan a driving based on these information. Also, a reachable range within 2 hours is displayed and the use of railways is guided when the driver cannot reach the destination within a predetermined time.

22 Claims, 13 Drawing Sheets

TOHOKU EXPRESSWAY

KAN-ETSU EXPRESSWAY

CHUO EXPRESSWAY

Fig. 6

DESTINATION

| DEPARTMENT STORE | IN ORDER OF ARRIVAL | RETURN |

A DEPARTMENT STORE    ○ ○ STORE    15 MINUTES ▽
B DEPARTMENT STORE    × × STORE    21 MINUTES

NAVIGATION SYSTEM TO BE MOUNTED ON VEHICLES

This is a continuation of application Ser. No. 08/288,211, filed on Aug. 9, 1994, which was abandoned.

BACKGROUND OF THE INVENTION i) Field of the Invention

The present invention relates to a navigation system to be mounted on vehicles for giving necessary information to a driver before and during driving.

ii) Description of the Related Art

A variety of equipment has heretofore been proposed for giving necessary information to a driver and offering the promise of comfortable driving. As one example of such equipment, a navigation system is well-known and has been installed on various kinds of vehicles. Also, various kinds of navigation systems have been developed, for example, one which simply displays map information on a display, another one exhibiting a present position of a driver's own vehicle on a map, and a further one which not only searches for the shortest route from a present position to a destination and displays it on a map, but also continuously guides along driven routes, together with indicating the present position of a vehicle while driving. By using such a navigation system, the driver can readily recognize the route up to the destination and the driver's load when driving can be reduced.

Further, as disclosed in Japanese Patent Laid-Open No. Hei 2-278116, a navigation system displaying the quickest route from a starting place to a destination, the shortest route and the route having the best fuel consumption rate has been developed. That is, in this case, the necessary time, traveling distance and fuel consumption of every section between intersections are stored in a database, and by using this database, necessary time, traveling distances and fuel consumption of a plurality of routes from the present position to the destination are calculated. Then, the routes to the destination being quickest, shortest, and having the best consumption rate are displayed. Hence, the driver can select any route and decide the route depending on his situation at that time. Consequently, the driver can decide which route matches his requirements at that time.

However, when a driver actually commences driving, he has a lot of requirements such as information about how much time it takes to reach a destination, and of whether or not refueling is required on the way, and information about which places can be reached in, for example, about two hours, and further about department stores reachable within 30 minutes. In the conventional navigation system, these requirements are not considered at all and thus no routes satisfying these requirements can be given. Also, time and necessary fuel are varied depending upon the extent of traffic congestion and the like, and it is preferable to enable the driver to take such factors into consideration. Further, there may be a requirement such as wanting to obtain information concerning what methods can be considered in order to reach the destination within a predetermined time.

SUMMARY OF THE INVENTION

Accordingly, it is an object of the present invention to provide a navigation system in view of the above-described problems of the prior art, which is capable of supplying information in accordance with a driver's requirements.

In the present invention, a navigation system to be mounted on a vehicle for carrying out a route search on the basis of map information and displaying the searched route, comprising reachable place estimating means for estimating reachable places along a route starting from a present position under predetermined conditions; and display means for displaying the reachable places estimated.

In this manner, the reachable place estimating means estimates the reachable places according to the predetermined conditions. Since the reachable places are displayed, a user such as a driver can readily plan their driving by viewing the display.

Also, one of the predetermined conditions in the reachable place estimating means is time, and a range reachable in a fixed time from the present position is displayed.

Hence, by displaying the range reachable within the predetermined time, the user can plan driving under this time limit.

Further, another predetermined condition in the reachable place estimating means is an amount of fuel being carried in the vehicle, and a range reachable from the present position using the fuel is displayed.

As described above, by planning the driving with the residual fuel and the like as limiting conditions on the reachable places, a driving plan that does not require any refueling can be readily made.

Also, the predetermined conditions in the reachable place estimating means can further include kinds of driving destinations.

Thus, by inputting the kind (object) of driving destination and displaying destinations which match with the object among the estimated reachable places, the processing is made easy and the driver can readily select the destination. For example, department stores reachable within 30 minutes can be readily located.

Further, the reachable places displayed by the display means are displayed on a map showing the reachable range.

In this way, by displaying the reachable places using the display means, a judgment on the reachable places can be readily carried out.

Also, the reachable places displayed by the display means are indicated on a map along with reachable routes.

As above, by displaying the reachable route using the display means, the usable route can readily be recognized.

Then, the display of reachable places in the display means is converted to a display of actually reachable points.

Hence, by displaying the reachable points, points which can be actually reached by the driver can easily be made known.

Further, the display of the reachable range in the display means is effected by changing a reduction scale of a display map on the basis of a distance up to at least one reachable point.

Thus, by changing the reduction scale of the display map depending on the reachable range, a map which most closely matches the driver's requirement can be displayed.

Also, the display of the reachable points in the display means is a display of a plurality of points determined in order of ease of reaching them.

In this manner, in the display of the reachable points, their order can be determined according to how easy they are to reach, and the driver can readily select a reachable point.

Moreover, the reachable places in the reachable place estimating means are corrected at any time on the basis of dynamic information which changes continuously during driving.

Hence, by utilizing the dynamic information, such as traffic jam information, even when driving using the information which enables an increase in the number of reachable places, practical information supply can be carried out. For example, since the plan can be corrected by making use of the dynamic information, the driver can deal with unexpected situations such as a traffic jam occurring as a result of an accident.

Further, the present invention features a navigation system to be mounted on a vehicle for carrying out a route search on the basis of map information and displaying the searched route, comprising: reachable place estimating means for estimating reachable places along a route starting from a present position, under predetermined conditions; reachable places expanding information receiving means for receiving information enabling an increase in the number of reachable places; and display means for displaying the reachable places estimated and the received information enabling an increase in the number of reachable places.

As described above, by considering the information which enables an increase in the number of reachable places, the driving range can be expanded to incorporate a wide range of driving plans.

Also, the predetermined condition in the reachable place estimating means is time and the information enabling an increase in the number of reachable places in the reachable places expanding information receiving means is information about a rest place.

In this way, by using the information of the rest place as the reachable places expanding information, a driving plan with an elongated driving time when time is a condition can be improved, and unreasonable driving plans can be prevented.

Further, the predetermined condition in the reachable place estimating means is fuel and the information enabling an increase in reachable places in the reachable places expanding information receiving means is information about a refuel station.

In this case, by using the information of the refuel station as the reachable places expanding information, a driving plan requiring additional fuel, when the fuel condition is a factor, can be improved and fuel shortage problems can be prevented effectively.

Also, in the present invention, there is provided a navigation system to be mounted on a vehicle for carrying out a route search on the basis of map information and displaying the searched route, comprising input means for inputting a destination; reachable place estimating means for estimating places that are reachable from a present position up to the input destination under a predetermined condition; and display means for displaying the reachable places estimated.

In this manner, by displaying the reachable places up to the destination, the driving can be evaluated under the predetermined condition and the drive plan can ensure that the driver exactly reaches the destination.

Further, the predetermined condition in the reachable place estimating means is time, and the possibility of reaching the destination in the fixed time, from the present position, is displayed.

Hence, how much time it will take the vehicle to reach the destination can be ascertained.

Also, the predetermined condition in the reachable place estimating means is an amount of fuel carried in the vehicle and the possibility of reaching the destination from the present position, using the carried fuel, is displayed.

As mentioned above, when the driving to the destination, the information such as whether or not to refuel can be obtained and a favorable driving plan can be made.

Moreover, in the present invention, there is provided a navigation system to be mounted on a vehicle for carrying out a route search on the basis of map information and displaying the searched route, comprising: input means for inputting a destination; reachable place estimating means for estimating reachable places from a present position up to the input destination under a predetermined condition; reachable places expanding information receiving means for detecting information enabling an increase in the number of reachable places; and display means for displaying the reachable places estimated and the detected reachable places expanding information.

In this way, since the information utilized by the reachable places expanding means, such as the alternative transportation, can be supplied, the driver can reach the destination via the optimum route including the use of railways.

Further, the predetermined condition in the reachable place estimating means is time and the information enabling an increase in reachable places in the reachable places expanding information receiving means is information about alternative transportation.

As described above, in the case of not being able to reach the destination in time, information about other transportation can be supplied, and the judging as to whether or not to use the other transportation can be readily carried out.

Moreover, the predetermined condition in the reachable place estimating means is fuel and the information enabling an increase in reachable places in the reachable place expanding information receiving means is information about a warning of uneconomic driving.

In this manner, since the uneconomic driving warning is issued, the driver can reach the destination even with limited fuel, without incurring any fuel shortage problems.

BRIEF DESCRIPTION OF THE DRAWINGS

The objects, features and advantages of the present invention will become more apparent from the consideration of the following detailed description, taken in conjunction with the accompanying drawings, in which:

FIG. 6 is a schematic view showing another example of reachable place name display according to the present invention;

FIG. 7 is a schematic view showing a display example of department stores according to the present invention;

DESCRIPTION OF THE PREFERRED EMBODIMENTS

The present invention will now be described in connection with its preferred embodiments with reference to the accompanying drawings.

Figure 1:
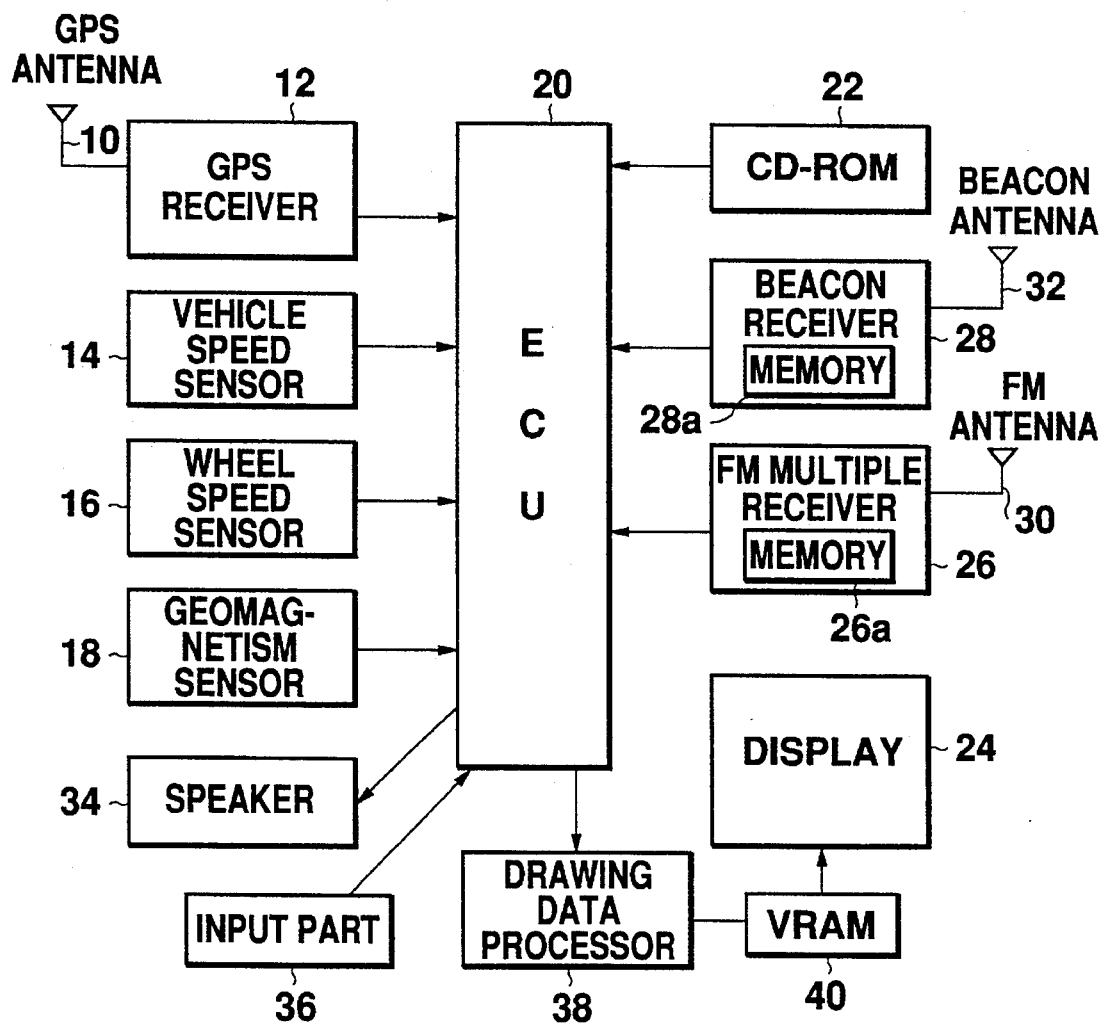
FIG. 1 is a block diagram of a navigation system according to the present invention.

In FIG. 1, there is shown one embodiment of a navigation system to be mounted on a vehicle according to the present invention.

As shown in FIG. 1, in order to constitute a GPS (global positioning system) navigation system, a GPS antenna 10, a GPS receiver 12, a vehicle speed sensor 14, a wheel speed sensor 16, a geomagnetic sensor 18 and an ECU 20 as a controller are provided. The GPS receiver 12 receives radio signals, sent from satellites positioned in geodetic orbits, via the GPS antenna 10. The ECU 20 calculates a latitude and a longitude of a present position of a vehicle now being driven by a driver, on the basis of the received radio signals. Further, even if no radio signals can be received from the satellites, the vehicle position can be calculated using other sensors such as the vehicle speed sensor 14, the wheel speed sensor 16 and the geomagnetic sensor 18. For example, using the wheel speed sensor 16, the distance traveled by the vehicle per unit time can be calculated, and also, using the wheel speed sensor 16 and the geomagnetic sensor 18, an extent of change in the moving direction can be calculated. The detection of the variation amount of this moving direction may be performed by a gyro system. By making the relative moving amount detected by these sensors correspond to map information stored in a CD-ROM 22, the ECU 20 calculates the vehicle position on a map. This map information and the vehicle position are superimposed and displayed on a display 24 so as to be provided to a user, such as a driver or the like. Also, a comparison of the detected vehicle position with the map information is continuously carried out (map matching) so as to judge whether or not the position on the map is appropriate. For instance, if there is no road at the place where the vehicle is now driving, but a road extends in parallel with the moving locus of the vehicle, the vehicle position is shifted to correct it so as to be shown driving along this road. Further, when the vehicle is turned to the right or left at a crossing, a positional correction is executed from the crossing position. Such corrections compensation for a position detection inaccuracies of the GPS or the like.

Further in this embodiment, as a means of receiving external information, an FM multiple receiver 26 and a beacon receiver 28 are provided.

The FM multiple receiver 26 receives FM signals via an FM antenna 30 and the received information is stored in a memory section 26a in the FM multiple receiver 26. This FM information includes, for example, information relating to traffic congestion and regulation on roads. The beacon receiver 28 receives communication sent from beacons installed on the side of a road via a beacon antenna 32, and the received information is stored in a memory section 28a in the beacon receiver 28. A microwave beacon transmits information around a local area having a radius of approximately several tens of meters. Utilizing this a beacon is installed at a predetermined position, such as 200 m before a certain crossing, and special information is transmitted to this crossing. Examples of the special crossing information include, a display of destinations reachable from the crossing, classified in terms of branching directions from the crossing, just like a road sign conventionally displayed before the crossing, and the time required (travel time) to reach the displayed destinations from the crossing. On the other hand, the FM signal is suitable for transmitting information over a wide area and is used for information transmission from a base station. This information may be, for example, traffic jam information for the whole of the metropolitan expressway network, control information such as diversions resulting from accidents or falling objects, and messages from road administrators.

As described above, after a display instruction, the information stored in the memory section 26a or 28a of the FM multiple receiver 26 or beacon receiver 28 is displayed on the display 24. This display instruction is executed, for example, after the termination of the reception or the detection directly under the beacon. Also, it can be executed after driving a predetermined distance or after a lapse of a predetermined time.

Moreover, important information is output by a voice from a speaker 34 so as to precisely transmit the information to the user even when the user is not looking at the display 24.

Also, an input section 36 is used for inputting various user instructions and it is preferable to provide a touch switch on the surface of the display 24 so that the display 24 may also partially serve as switches.

In this case, although the displaying on the display 24 is carried out using data sent from the ECU 20, a drawing data processor 38 plots map data and the like as data corresponding to the display on a one to one basis into a video RAM (VRAM) 40, and this data is read out of the VRAM 40 in synchronism with the scanning of the display 24, and is displayed.

Figure 2:
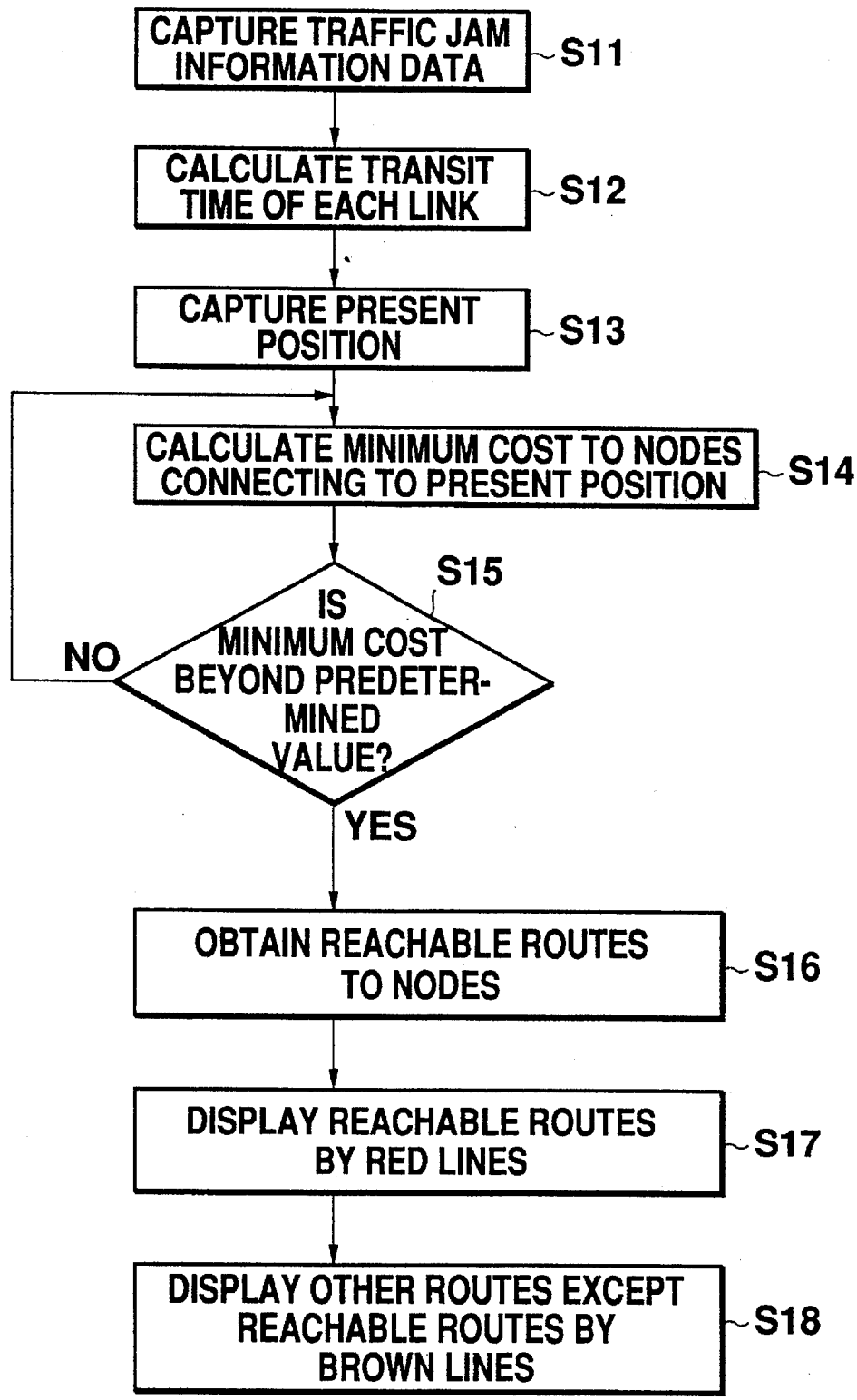
FIG. 2 is a flowchart showing a display operation of a reachable route according to the present invention.

Display of Reachable Range (condition:time):

In this embodiment, a vehicle's reachable range, from the present position, within a predetermined time, is displayed. This operation will now be described in connection with FIG. 2. That is, first, the ECU 20 retrieves the traffic jam information from the information stored in the memory section 26a of the FM multiple receiver 26 in step S11. This traffic jam information is the information transmitted from the base station nearby and includes all traffic jam information required for driving from the present position. When the traffic jam information is the transit time of a link, the transit time of each link is calculated directly, or when the traffic jam information is an average running speed, the transit time of each link is calculated using distance information supplied from the CD-ROM 22 in step S12. In this case, the link represents a road connecting two branch points (nodes) and consists of a different link for an up or down direction. Concerning each link, in the case of no traffic jam, the necessary transit time of the link can be calculated from the distance data, restricted speed data and the like. Next, the ECU 20 retrieves the present position of the vehicle, from the data output from the GPS receiver 12, in step S13.

In this manner, when all the information for driving has been obtained, the minimum cost to all nodes coupled with the present position is calculated in step S14. In this embodiment, time is used as a predetermined condition. Hence, the minimum cost in this case means the shortest necessary time to a predetermined node connected to the present position, via a link. And it is discriminated whether or not this minimum cost exceeds a predetermined value in step S15. This predetermined value is a value restricting a reachable range to be searched from the present position, and can be changed by a certain incremental value such as one hour, 30 minutes or the like. When the minimum cost does not exceed the predetermined value in step S15, the operation returns to step S14 and the minimum cost calculation for the next node connected with the node previously calculated is carried out. In this case, for example, the Dijkstra method can be used for route search and the detailed description of the actual search can be omitted for brevity.

In step S15, when the minimum cost exceeds the predetermined value, the condition for this route (for example, within an hour's drive) is not satisfied, and thus the search processing will be terminated.

That is, each route to the farthest node within a predetermined value is determined as a reachable route in step S16, and the reachable routes are displayed as red lines in step S17, and routes other than the reachable routes are displayed as brown lines in step S18. Such displays are executed by determining the colors of the roads from the map data and the aforementioned processing results and changing the data that is written into the VRAM 40 by means of the drawing data processor 38.

Figure 3:
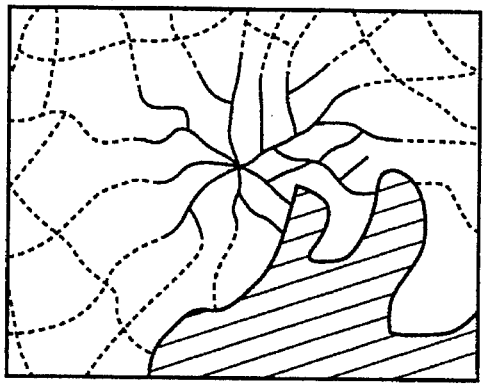
FIG. 3 is a schematic view showing a display example of a reachable route according to the present invention.

Accordingly, as shown in FIG. 3, the routes in the reachable range are displayed around the present position in such a way that they can be clearly understood at a single glance. In FIG. 3, the reachable routes are shown by solid lines while the other routes are shown by broken lines. Also, in an actual display, the reachable routes can be separated by solid or broken lines, or they can be displayed by flashing.

As described above, in this embodiment, in the current traffic environment, the reachable area can be ascertained almost immediately. Hence, by using this method, an effective traveling schedule can be made.

Display of Reachable Range (condition:fuel):

Although the necessary time is the condition in the above-described embodiment, the fuel can be used as a condition in place of the necessary time. That is, the amount of fuel currently being carried is detected as an output from a fuel gauge. On the other hand, in the calculation of the minimum cost in step S14, the cost of one link is calculated as a fuel amount used. That is, the fuel amount used is calculated at each link, from the travel distance and the necessary time. The minimum cost for reaching a predetermined node, i.e., the minimum fuel amount used, is calculated. In step S15, it is discriminated whether or not the fuel amount used exceeds the amount of the fuel being carried. As a result of this discrimination, the reachable range using the fuel amount being carried at present can be ascertained, and this is displayed on the display 24 in the same manner as the above embodiment.

In this embodiment, a key denoted "reachable area" is displayed on a menu screen of the display 24 and this key can be used as the input section 36 for instructing the display of the reachable area. By pressing this "reachable area" key, one of the screens "time" or "fuel" is selected, and the desired condition can be input.

Figure 4:
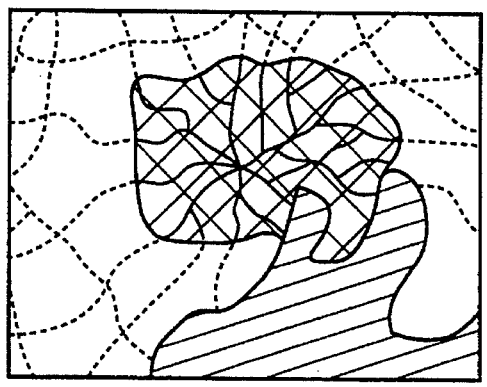
FIG. 4 is a schematic view showing a display example of a reachable range according to the present invention.

Display of Reachable area (display of area):

Although the routes up to the reachable nodes have been displayed in the above-described example, the present invention is not restricted to this, and a range display, as shown in FIG. 4, can be carried out. In FIG. 4, although the reachable area is shown by a hatched area, it is preferable to display the reachable area in color, with the other areas in monochrome. This display switching can be performed by controlling the writing of data into the VRAM 40 depending on the data sent from the ECU 20 by means of the drawing data processor 38.

Figure 5:
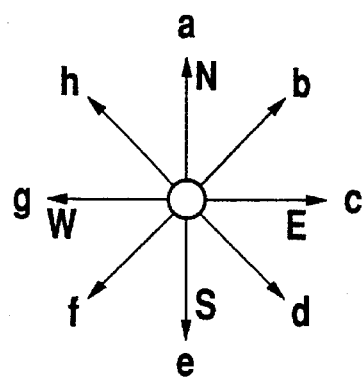
FIG. 5 is a schematic view showing one example of reachable place name display according to the present invention.

Display of Reachable Points:

Further, the display of the reachable range can be replaced with the display of the reachable points. For example, as shown in FIG. 5, the reachable points in all directions can be displayed using letters or characters or, as shown in FIG. 6, every route to the reachable points can be displayed using characters. Also on the screen, as shown in FIG. 3, the place name corresponding to the farthest reachable node can preferably be displayed in large characters.

Driving Depending on Destinations:

Also, in addition to the aforementioned time and fuel conditions, driving destinations can preferably be added to the conditions. That is, in the case of going shopping in department stores or supermarkets, there is the requirement that the stores reachable within 30 minutes are listed, and the destination is selected from the list. Also, in the case of driving to pleasure resorts, there arises the requirement that the destination is selected from the pleasure resorts reachable within 2 hours. Hence, the destination of the driving is input through the input section, 36 and a list of place names satisfying the desired destination can be displayed.

For instance, in this embodiment, when the time is set as the first condition, after selecting "time", the "destination input" key is displayed, and by pressing this key, the destination, such as "department stores", "supermarkets", "hospitals", "stations", "hotels" or the like is displayed to prompt for the input. When an input is executed, the destination satisfying the condition is selected from within the reachable range searched as described above. That is, in the case of department stores reachable within 30 minutes, after 30 minutes is input as the time condition, "department stores" is selected as the type of destination. Thus, the department stores reachable within 30 minutes are listed, and this list is displayed, as shown in FIG. 7. In this manner, the department store names and the time it takes to reach them are displayed in order of earliest estimated arrival time.

Next, one example of drive guidance, with type of destinations as a fixed condition, will now be described with reference to FIGS. 8 and 9.

Figure 8:
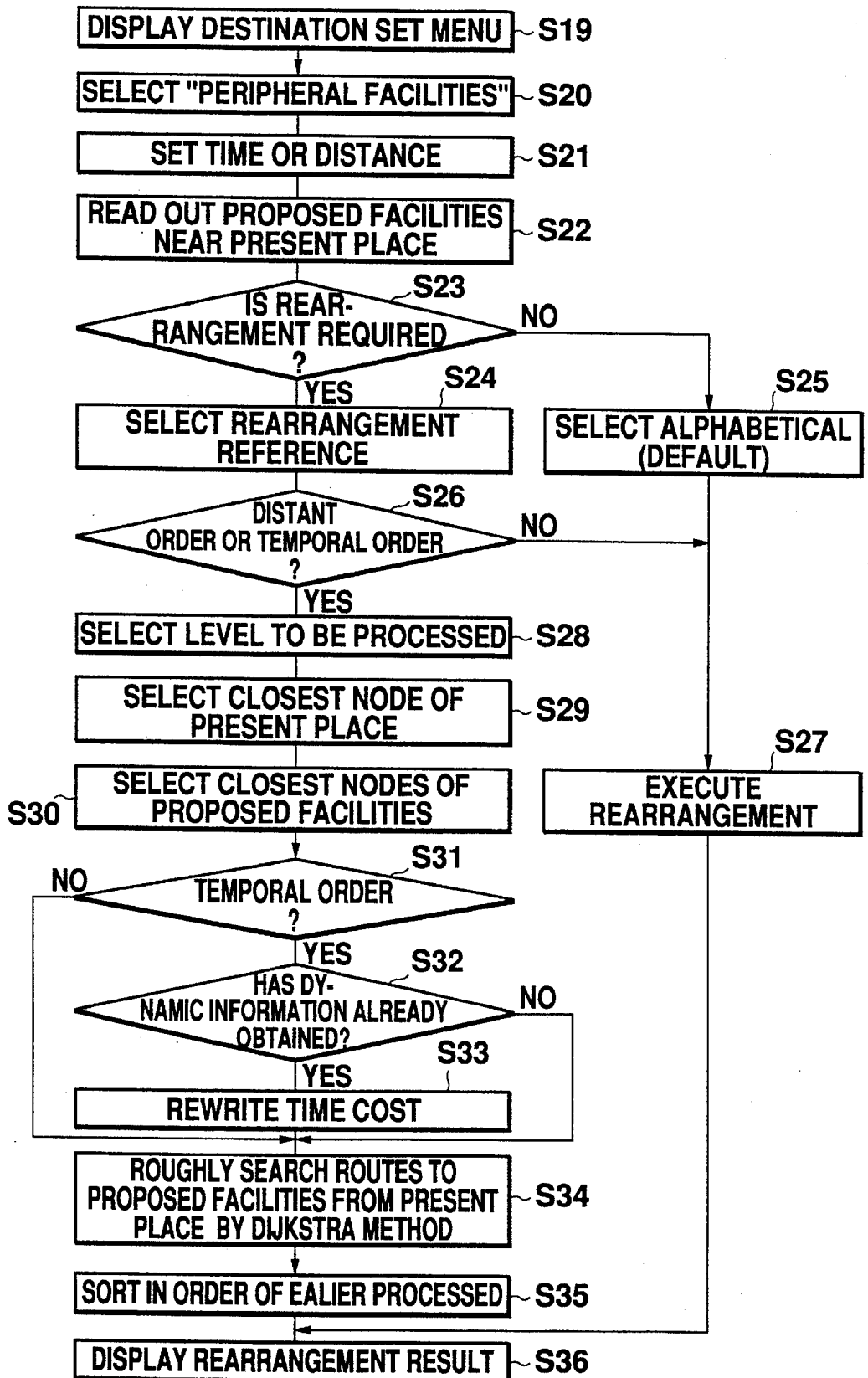
FIG. 8 is a flowchart showing the front half of an operation of a guidance depending on destinations according to the present invention.
Figure 10A:
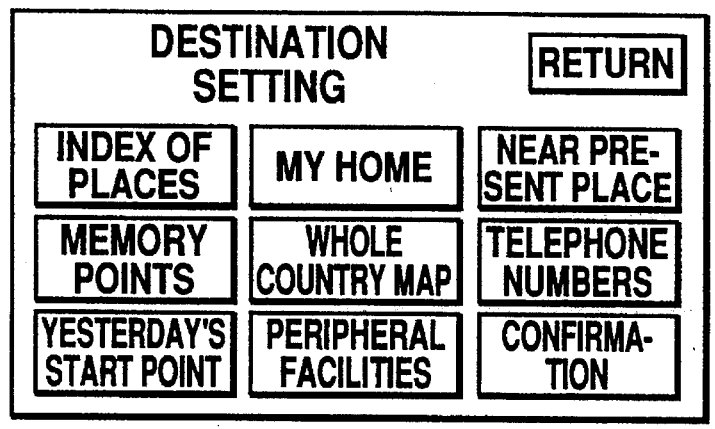
FIG. 10A, 10B and 10C are schematic views showing a display example in the guidance depending on destinations according to the present invention.
Figure 10B:
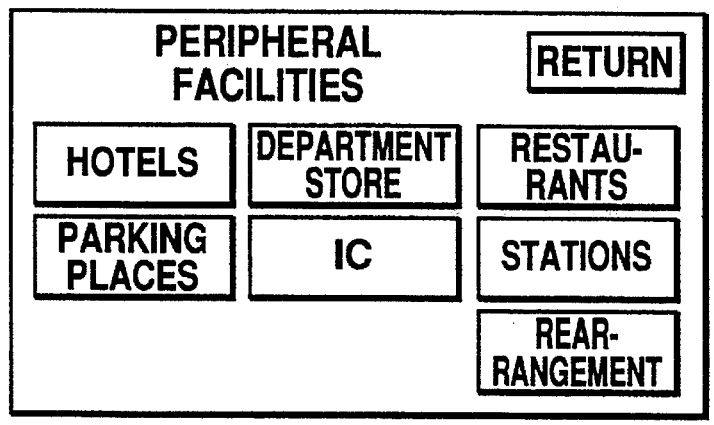

First, in a main menu, as shown in FIG. 8, a destination set key is pushed to display a destination set menu, as shown in FIG. 10A in step S19. Then, a "peripheral facilities" key is selected, to display a screen for selecting the peripheral facilities shown in FIG. 10B. The destination is set in this screen in step S20. That is, one desirable type of destination is selected from "hotels", "department stores", "restaurants", "parking places" "interchanges (IC)" and "stations". The time (or distance) is set as the condition in step S21. By executing this step, the department stores or the like reachable within 30 minutes can be set as the destination. In this case, with respect to the department stores or restaurants, it is convenient to set a time of 30 minutes or the like as a default value.

Figure 10C:
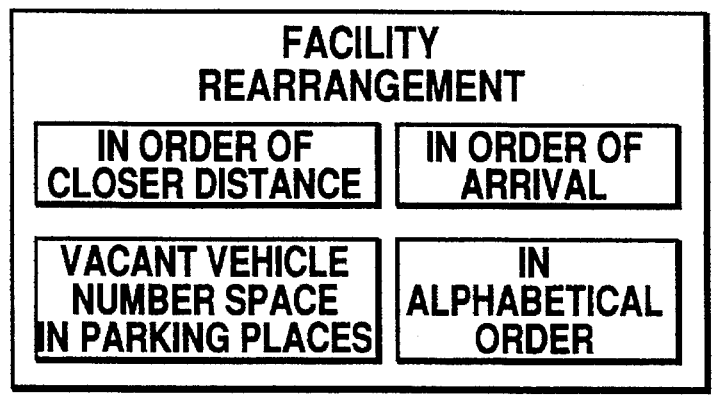

After the input of the conditions is finished, the predetermined condition such as the range reachable within 30 minutes is estimated by the aforementioned processing and the specified facilities within this range (for example, the department stores), from the present position are read out in step S22. Next, it is discriminated whether or not a rearrangement is required in step S23. That is, a key denoted "rearrangement" is displayed on the screen shown in FIG. 10B, and if this key is pressed, the screen shown in FIG. 10C is displayed, and a rearrangement reference is selected in step S24. In this case, the rearrangement reference includes four kinds, such as "in order of closeness (distance)", "in order of arrival (time)","number of vacant vehicle parking places" and "in alphabetical order", with the option "in alphabetical order" being set as a default value. Then, when no rearrangement is required in step S23, the alphabetical order is selected in step S25. When an interchange is selected as an outlying destination, the "number of vacant vehicle parking places" is not displayed. In turn, when the rearrangement reference is selected in step S24, it is discriminated whether the selected reference is related to Distance or time in step S26. In the case of a rearrangement other than these two, no particular processing is required and the rearrangement is executed directly in step S27. Also, the alphabetical order is selected in step S25, and operation moves to step S27.

On the other hand, when the rearrangement is in terms of either distance or time, a level or layer to be processed is selected in step S28. This is why, when there are many proposed facilities in the area near the present position according to the distribution state of the facilities read in step S23, the processing is executed in a narrower area (a reduced scale map), and on the contrary, when there are few proposed facilities, the processing is carried out over a wider area (an expanded scale map). By making use of this level selection, it can be ensured that a predetermined number of proposed facilities will result in an effective search.

As described above, in the case where the proposed facilities are selected and the map (level) is selected, the closest node to the present position is selected in step S29 and the closest nodes to the proposed facilities are selected in step S30. Then, it is discriminated whether or not it is the conditions are related to time, in step S31, and in the case of the time related conditions it is discriminated whether or not dynamic information (traffic jam information) has already been obtained, in step S32. In the case where the dynamic information is obtained, a time cost is rewritten in step S33 and the operation moves to step S34. In turn, in the case where no dynamic information is obtained in step S32, the time cost is estimated directly, and the routes approaching the proposed facilities from the present position are searched for in step S34. This search is performed using the Dijkstra method in the same manner as described above, but since this is a search of a simple selection, a relatively rough search is executed. In this case, when the time cost is used as the cost of each link, the quickest routes to the destinations can be searched and, when the distance cost is used, the shortest routes can be searched.

Next, after this search has been executed, the results are sorted into the earlier processed order in step S35. This means that the earlier displayed route has a lower cost and the result is arranged in terms of time or distance considerations. The result after rearrangement is displayed in step S36. That is, for example, the display as shown in FIG. 7 is effected.

Figure 9:
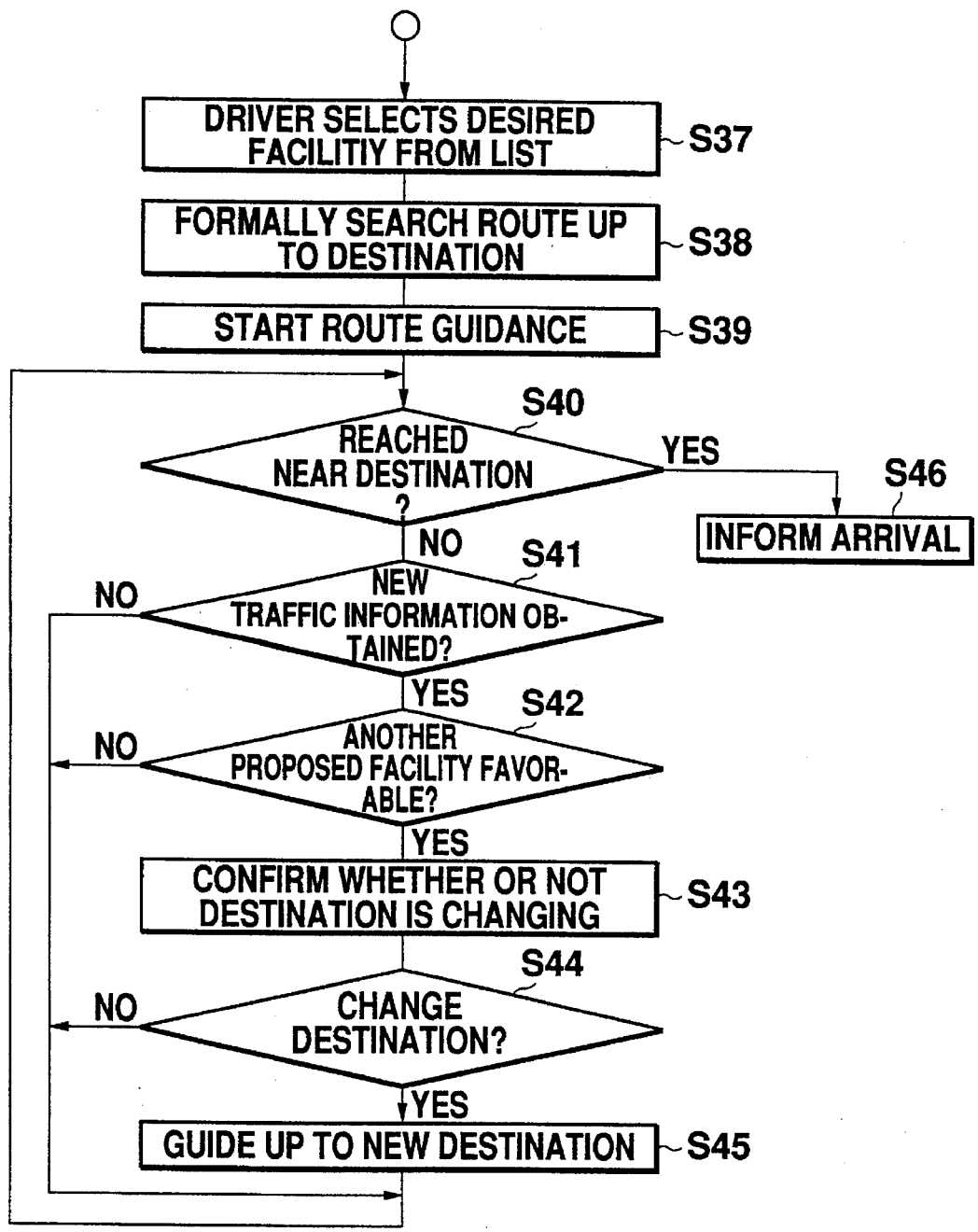
FIG. 9 is a flowchart showing the rear half of an operation of a guidance depending on destinations according to the present invention.

Then, as shown in FIG. 9, and described above, the proposed facilities near the present position are displayed as destinations in order of satisfying the predetermined conditions, and the driver selects the desired facility from this list in step S37. Hence, the destination is formally decided and thus the route to the destination is formally searched in step S38. This search is executed by the Dijkstra method in the same manner as described above, which is a high precision route search. Route guidance according to the search result is started in step S39. That is, the searched route is displayed on the map and the present position is also displayed, indicating that driving is being performed along the correct route. At the same time, at a crossing where a turn is to be made to the right or left, the correct turning direction is clearly displayed on an enlarged map of the crossing when the vehicle is at a position before the crossing, and the guidance of the turning to the right or left is executed by voice. In this manner, the driver can receive the guidance up to the destination.

In this embodiment, besides the normal guidance described above, a check of the guidance is carried out according to new traffic jam information and the like. That is, it is discriminated whether or not the vehicle is approaching the destination (for example, within 500 m of the destination) in step S40, and if it is not approaching the destination, it is discriminated whether or not new traffic information has been obtained in step S4. In the case of obtaining new traffic information, it is discriminated whether or not another proposed facility is now more favorable in step S42. That is, when the traffic jam situation changes, it is possible that the selected facility (for example, the department store) as described above becomes no longer favorable. Hence, when another proposed facility becomes more favorable, it is confirmed whether or not the driver wishes to change the destination in step S43, and in the case of changing the destination in step S44, the operation is changed so that guidance is issued up to the new destination in step S45. When new traffic information is not obtained in step S41, when another proposed facility does not become more favorable in step S42, or when the destination is not changed in step S44, no guidance change is required and the operation returns to step S40. In step S40, when the vehicle reaches the destination, the arrival is announced in step S46 and the entire process is completed.

As described above, in this embodiment, when the facilities such as the department stores, restaurants or the like exist near the present position, a plurality of facilities satisfying the predetermined condition (e.g., the time) are searched, and this information is supplied to the driver. Then, the driver selects the desired one from the list and can make use of guidance up to the destination. Further, when the selected optimum facility is changed owing to conditions such as a changed traffic jam situation, this fact is notified to the driver and the driver can change the destination on the basis of new information. Hence, guidance satisfying the driver's requirements of wanting to go to a department store within 30 minutes, can be performed.

Figure 11:
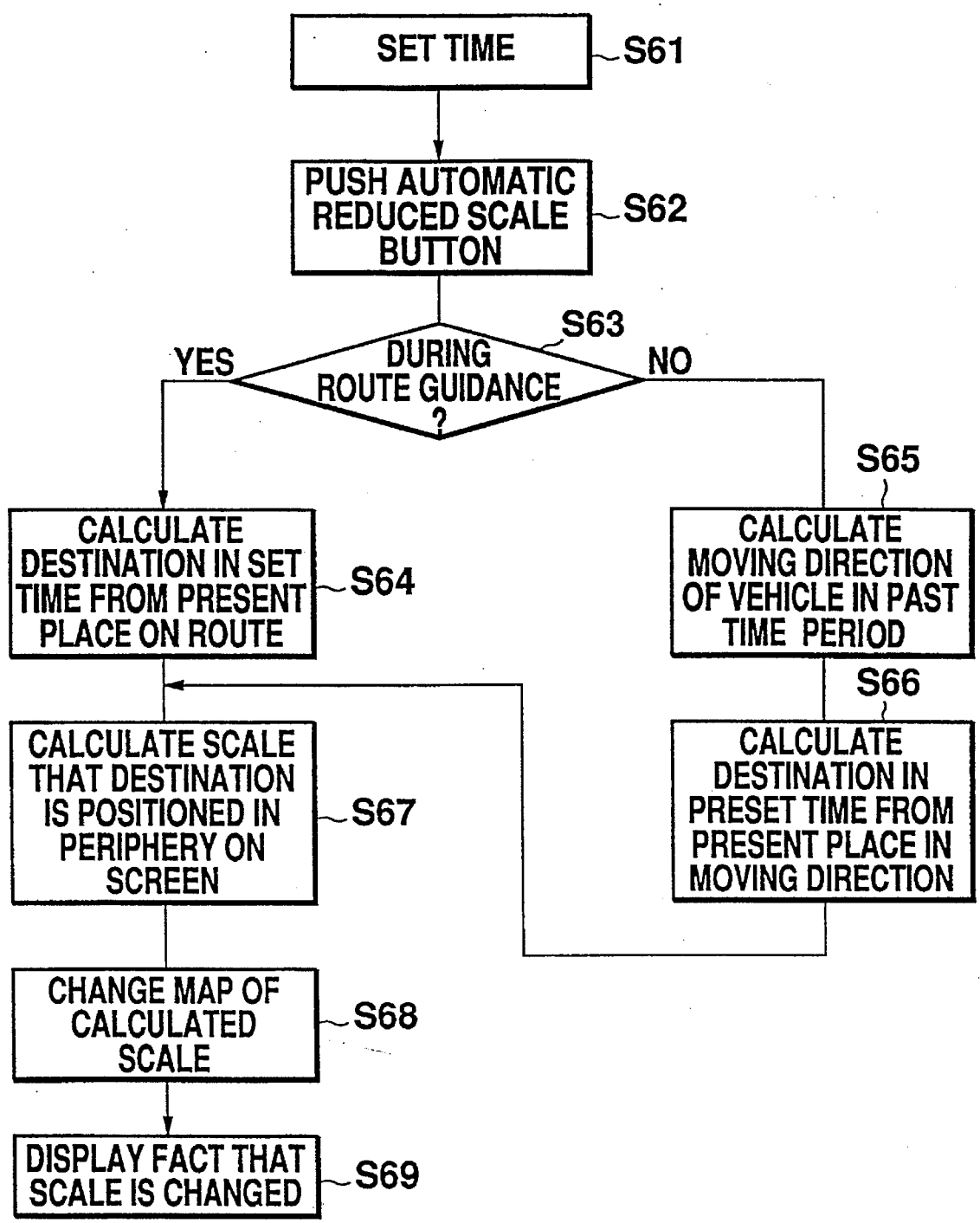
FIG. 11 is a flowchart showing an operation of an automatic reduction scale according to the present invention.

Automatic Map Scale Reduction:

Next, an automatic scale reduction of a displayed map will be described in connection with FIG. 11. That is, in the case where the time,is set in step S61, as described above, an automatic reduced scale button is displayed. And when the automatic reduced scale button is pushed in step S62, the scale of a displayed map is automatically reduced. Accordingly, it is initially discriminated whether or not route guidance is in progress in step S63. This is a discrimination as to whether or not the present driving course is correct for the selected destination.

When the route guidance is being executed, a destination on the route, which is reachable from the present position in the set time, is calculated in step S64. On the other hand, when route guidance is not being carried out, the moving direction of the vehicle during a specific past period of time is calculated in step S65 and a destination in the moving direction which is reachable from the present position in the fixed time is calculated in step S66. In this manner, when the destination in the moving direction of the vehicle is calculated, a reduced scale is calculated so that the destination may be shown at the periphery of the screen in step S67. The map is changed to a calculated reduction scale, and the reduced scale map is displayed on the display 24 in step S68. Further, the reduction scale change is also displayed in step S69.

As described above, a map showing destinations which can be reached from the present position in the fixed time can be displayed at the optimum reduction scale. Also, in this embodiment, by taking the moving direction of the vehicle into consideration, destinations in the moving direction that can be reached in the fixed time can be obtained, and the reachable area according to with the driver's requirement can be displayed. Further, it is preferable to combine the inputs of the destinations as described above, for example, when a restaurant reachable within 30 minutes is searched for while driving toward the destination, a suitable restaurant can be displayed by flashing on the displayed map. In this case, the input of the destination or the like can be carried out in the same manner as described above.

Further, in accordance with the traffic jam information, the reduction scale of the map can be automatically changed. That is, in the traffic jam situation, the movable distance per unit time is small, and it is better from the driver's point of view to display a map having a slightly reduced scale rather than a map having a greatly reduced scale. Consequently, owing to the traffic jam information near the present position in the direction toward the destination, the reduction scale of the map is changed. For example, the reduction scale of the map can preferably changed so that the points reachable within 30 minutes may be shown on the periphery of the map.

Moreover, although the points reachable within the predetermined time from the present position are obtained and the reduction scale of the map is changed when the obtained point is displayed on the map, this is expanded and it is preferable to change the reduction scale of the map so that the reachable points may be positioned at the peripheral portions of the displayed map in all directions. Because of this map scale change, the map can be shown on the time axis considering the traffic jam and the like. Accordingly, on the displayed map, in a district containing the traffic jam, a distance of 10 km is shown as a long distance, whereas in a district not containing a traffic jam, a distance of 10 km is shown as a short distance. Since it is difficult to change the reduction scale of the map in all directions, the reduction scale of the map can be changed in a predetermined range in a particular direction on the basis of the number of essential roads affected by the traffic jam situation. Further, as shown in FIG. 5, the reduction scale of the display can be changed depending on the direction.

Further, the traffic jam information is renewed every predetermined time period by the appropriate information source. Hence, all the aforementioned processing and display can preferably be changed dynamically with the input of the latest information.

Increasing the number of Reachable points:

As described above, according to the present invention, the reachable places can be searched depending on a predetermined time and fuel information. However, the fuel and time conditions can be changed depending on certain conditions. For instance, when driving on an expressway, if rest places are provided, the driving time can be extended and, if fuel service stations are present, more distant places can be driven to. Hence, it is preferable to supply information about increasing the number of such reachable points.

In this embodiment, when displaying the reachable places under the above-described time and fuel limiting conditions, whether or not information about rest places, fuel service stations and the like is required is displayed. When these are selected, the relevant information is supplied. Further, when the rest places or the fuel service stations are selected, the search of the reachable range according to the limiting conditions of the predetermined time and the predetermined fuel amount can be executed, using the rest places or the fuel service stations as the starting point. Accordingly, the destination guidance with an increased number of reachable points can be carried out.

Moreover, such guidance can be specifically requested in some cases where the destination is determined. That is, when driving to the destination, refueling along the way can be requested. In such a case, the need for a refueling point within the reachable range is discriminated and the guidance including this discrimination is performed. This guidance operation will now De described in connection with FIGS. 12 and 13.

Figure 12:
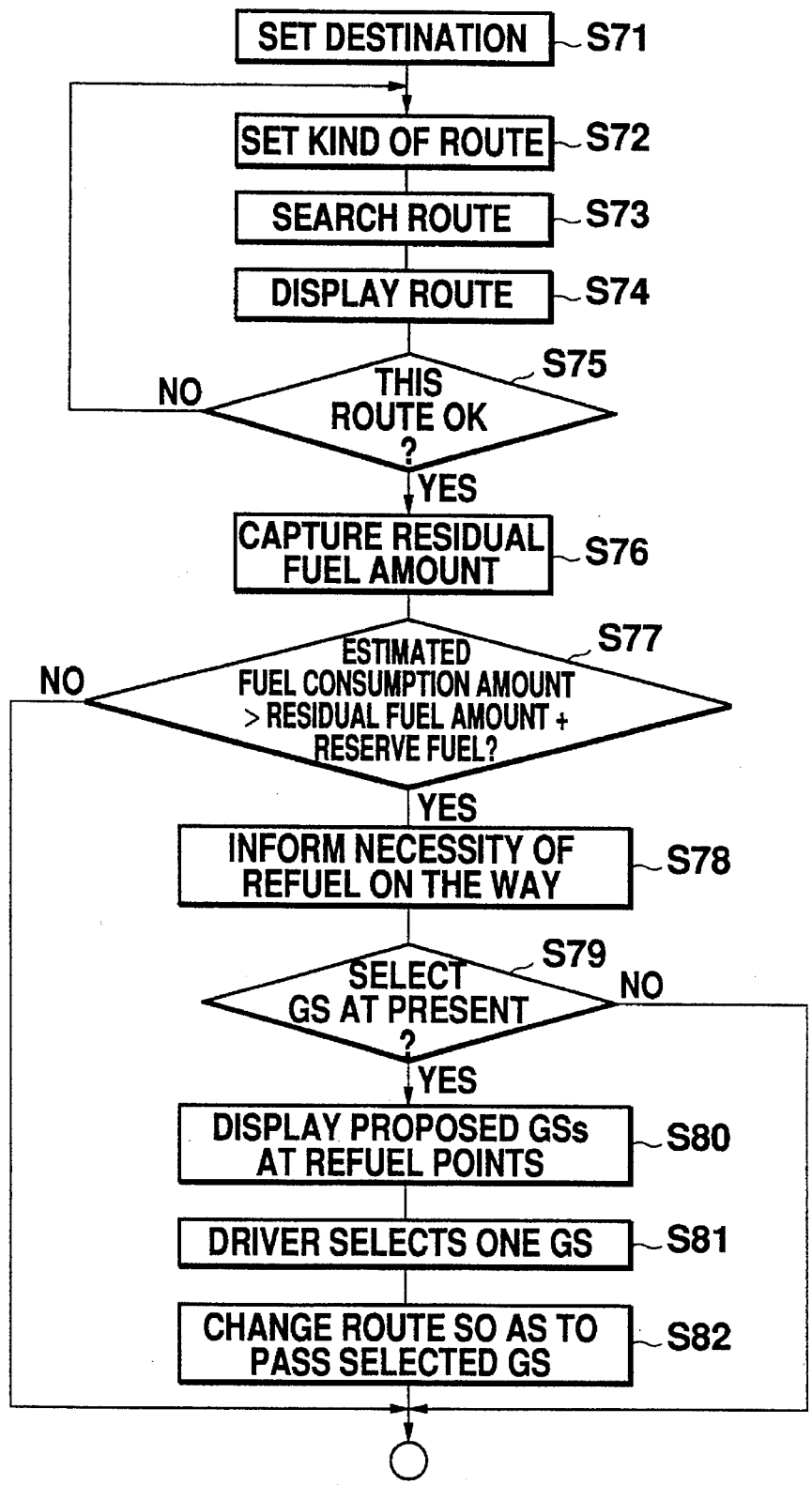
FIG. 12 is a flowchart showing the front half of an operation of a guidance for determining a fuel supply point according to the present invention.

First, as shown in FIG. 12, a destination is set in step S71, and a kind of route is set in step S72. The kind of route represents "time critical", "drivability", "economy" and the like. When time is selected, the economy and drivability are not so highly considered, for example, expressways and roads having a narrow width may be selected, and a route which only requires a short time is selected. When drivability is selected, a route is searched for which a driver considers to have high drivability, such as a route comprising roads which do not encounter traffic jams (even if a roundabout way is taken), wide roads, expressways and the like. When economy is selected, toll roads, expressways, roads consuming a lot of fuel, roads taking a roundabout way etc. are avoided, and a route is selected Which will result in the minimum fuel consumption.

When this kind of route is selected, the cost of each link is changed according to the kind of route, and the route is searched using the Dijkstra method in step S73. In this instance, it is assumed that economy is selected. Thus, the route incurring the minimum fuel consumption is searched. Hence, a travel cost for each link is calculated as follows:

Travel cost=Link length×Fuel consumption rate+(Crossing stop probability×Signal aspect time×Idling consumption amount+ Fuel consumption amount at starting time)

In this equation, the fuel consumption rate is a function of driving speed and transit time of a link (or an average driving speed) is decided from the traffic Jam information. Also, the number of lanes and an average grade are preferably considered. The fuel consumption rate is obtained from the average driving speed obtained above. Further, the crossing stop probability classified by the moving direction and the average driving speed is stored in a database and the signal aspect time (duration of a red signal) and the like are also stored in the database. Moreover, concerning the fuel consumption amount at starting time, it is preferable to hold this value for every speed reached after starting. Also, in a traffic jam section, a fuel consumption amount for stop/start times and a stop time is calculated from a traffic jam length and a traffic jam transit time and the obtained fuel consumption amount is added. Depending on systems, an approximation of the minimum time route=the minimum fuel route can be carried out. Also, the above calculation is not conducted on-line but done off-line and the calculation result can be stored in the database. In this calculation, the transit time, an average traveling speed, the crossing stop probability and the like are set on the basis of their average states. According to the dynamic traffic jam information, a fuel consumption increase factor can be obtained as supplementary information.

As described above, after the route search is finished in step S73, the preferable route is displayed in step S74. At this point, it is confirmed whether or not the driver accepts this route in step S75. When the driver does not accept this route, the operation returns to step S72 where the driver requests another route and the route search is repeated.

When the driver accepts the route in step S75, a residual fuel amount is stored in step S76. This can be executed using a signal output from the fuel gauge mounted on the vehicle. Then, using the fuel consumption amount utilized in the aforementioned route calculation as an estimated fuel consumption amount, it is discriminated whether or not the estimated fuel consumption amount is larger than the residual fuel amount and a reserve fuel amount (for example, 5 liters) in step S77. When the estimated fuel consumption amount exceeds the residual fuel amount plus the reserve fuel amount, then refueling will be required on the way and this is notified to the driver in step S78. The driver is also asked whether or not he wishes to select a gas station or gasoline stand (GS) at this time, in step S79. When the driver selects the GS at this time, the GS's near the point where the fuel supply is required (refuel point or fuel supply point) are retrieved from the map data and the obtained GS's are displayed as the proposed GS's in step S80. When the driver selects one of the GS's in step S81, the route is changed so as to pass the selected GS in step S82.

Figure 13:
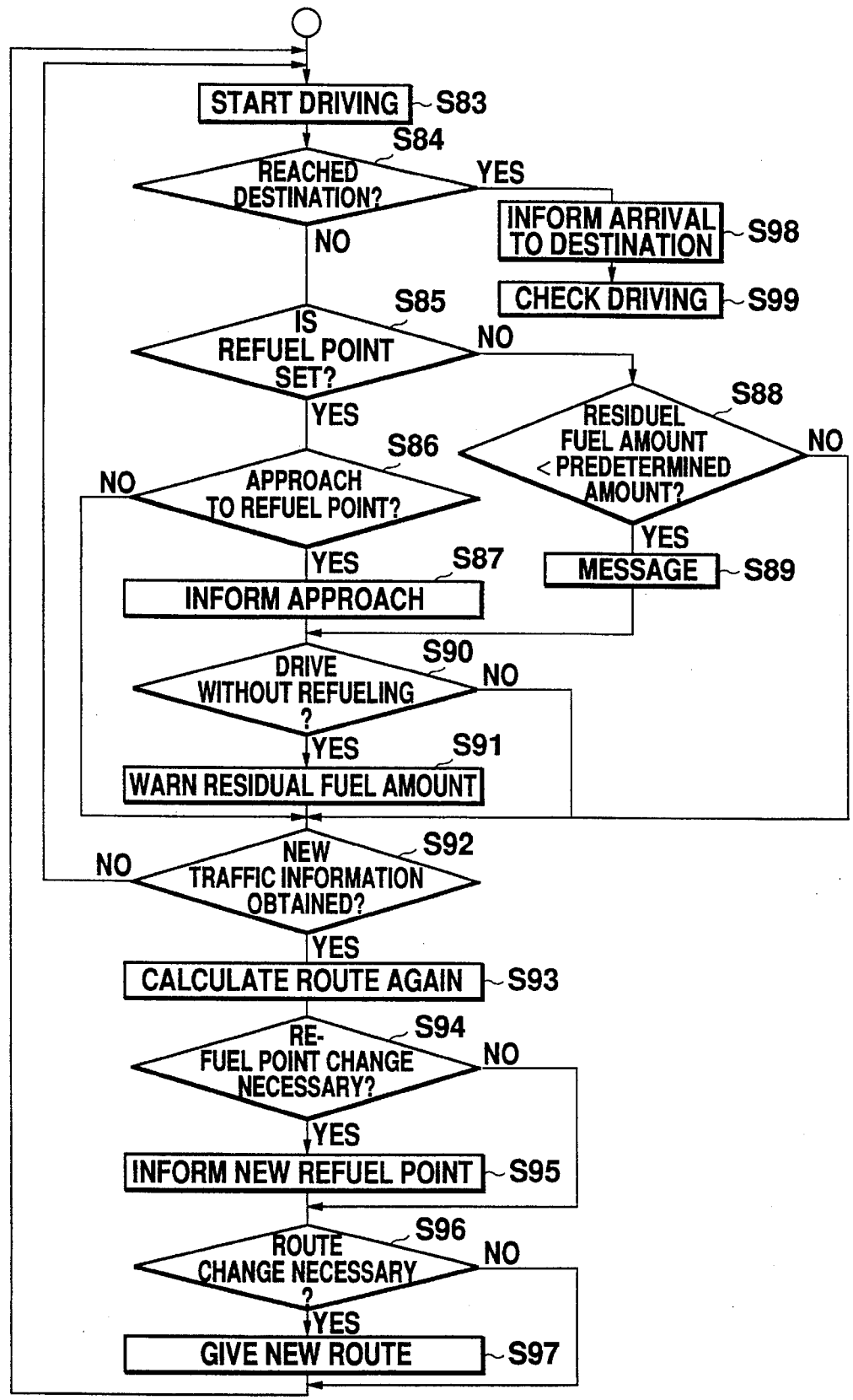
FIG. 13 is a flowchart showing the rear half of an operation of a guidance for determining a fuel supply point according to the present invention.

In this manner, as shown in FIG. 13, when the route to the destination is determined, the driving is commenced in step S83, and the usual route guidance is conducted. Then, at step S84, it is discriminated whether or not the vehicle has reached the destination, and if the vehicle has not yet reached the destination, it is discriminated whether or not the refueling point is set in step S85. When the refueling point is set, it is discriminated whether or not the vehicle is approaching the refueling point in step S86 and, when the vehicle approaches the refueling point, this fact is notified to the driver in step S87.

On the other hand, when no refueling point is set in step S85, it is discriminated whether or not the residual fuel amount is less than a predetermined amount (for instance, 5 liters) in step S88 and, when the residual fuel amount is less than the predetermined amount, a message indicating that there is only a small residual fuel amount is displayed in step S89.

After step S87 or step S89, the driver is asked whether or not the driving is to be continued without refueling in step S90 and, when the driving is continued without refueling, a warning about the residual fuel amount is given to the driver in step S91. In turn, when the driving is not continued without refueling in step S90, the operation moves to step S93.

Further, it is discriminated whether or not new traffic information is obtained in step S92, and when no new traffic information is obtained, the operation returns to step S83 to continue the process. When new traffic information is obtained in step S92, the travel cost of the link is changed on the basis of the new traffic information to calculate the route again in step S93. Next, it is discriminated whether or not it is necessary to change the refueling point in step S94 and, when it is necessary to change the refueling point, a new refueling point is indicated to the driver in step S95. Also, it is confirmed whether or not the driver requires a route change in step S96 and, when the route change is required, a new route is supplied in step S97, and the operation returns to step S83 to continue the process. Then, when the vehicle reaches the destination, the arrival at the destination is announced in step S98.

Then, in this embodiment, after the arrival at the destination, a check of the driving is executed in step S99. In this driving check, the driver's driving is checked from the driving state and the fuel consumption state and the actual fuel consumption amount is compared with a fuel consumption amount calculated on the basis of data predetermined from the characteristics of the vehicle so as to discriminate whether or not economic driving has been performed. When it is discriminated that uneconomic driving has been conducted, an evaluation and advice such as messages like "More fuel more than necessary was consumed on starting.", "Please pay attention to over depression of the accelerator" or the like are displayed. Further, such a check can be executed on the way to the destination.

Guidance of Service Areas On Expressways:

On an expressway, the driver may have some hesitation about whether or not to enter a service area or a parking area. When deciding whether or not to enter the next service area or the next parking area, information about the subsequent service area or parking area after helps the driver with his judgment. In this embodiment, as shown in FIG. 14, this information is supplied to the driver.

Figure 14:
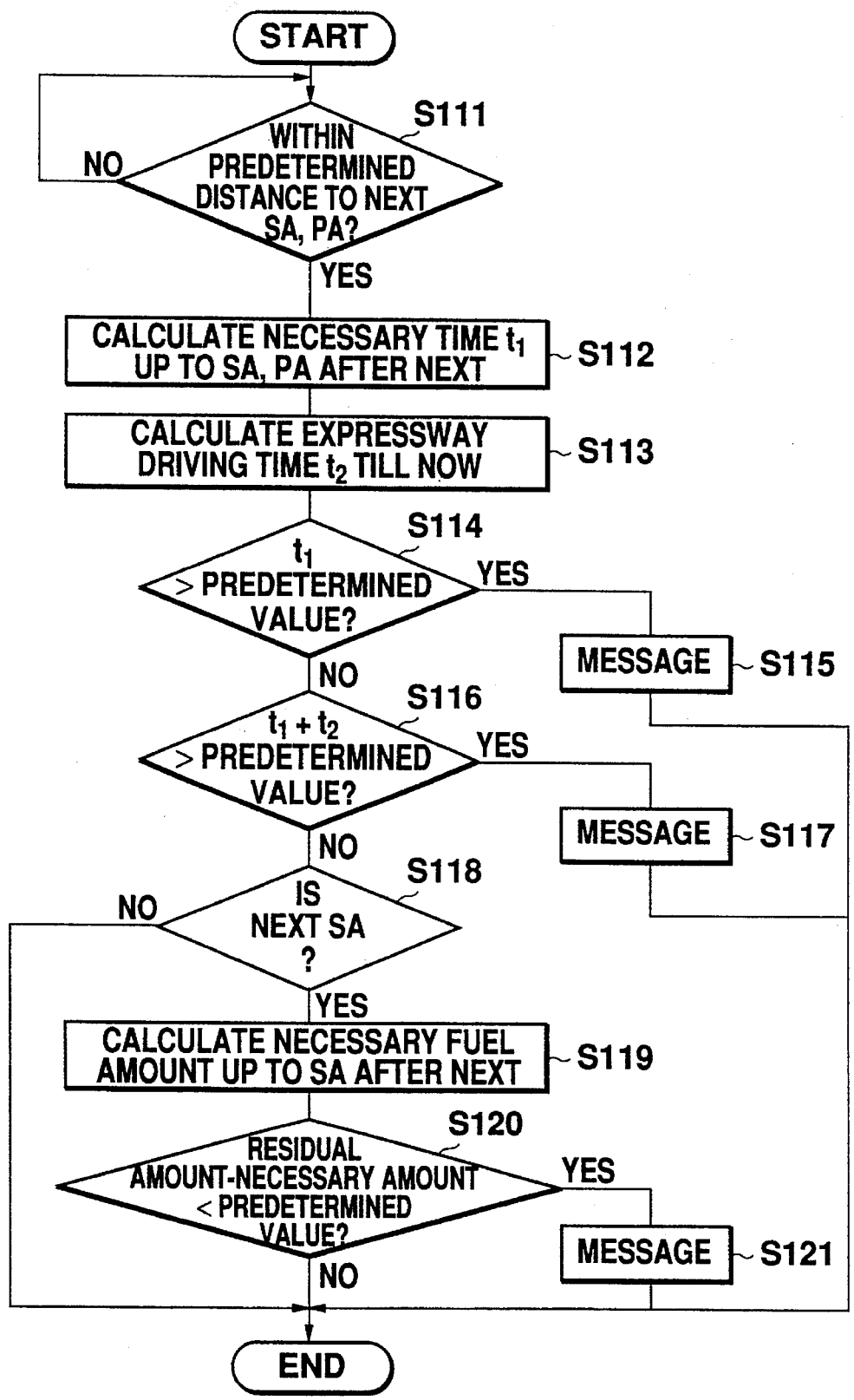
FIG. 14 is a flowchart showing a guidance operation of service areas and parking areas on an expressway according to the present invention.

First, in FIG. 14, it is discriminated whether or not the vehicle is within a predetermined distance (for example, 5 km) of the next service area (SA) or the next parking area (PA) in step S111 and, when the vehicle is within the predetermined distance, the time t1 it will take to reach1 the SA or the PA after next is calculated in step S112. This time t1 is the time required, taking into consideration the traffic jam information and the like. Next, a continuous driving time t2 on the expressway up to now is calculated in step S113. This time t2 is the time from entering the expressway or from the previous rest.

It is also discriminated whether or not the time t1 is larger than a predetermined value (for example, one hour) in step S114. When the time it will take to reach the SA or the PA after next is more than the predetermined value, due to a traffic jam or the like, a message such as "It will take at least one hour to reach the PA after next because there is a traffic jam." or the like is displayed in step S115.

When time t1 is less than or equal to the predetermined value in step S114, it is discriminated whether or not t1+t2 exceeds a predetermined value (for example, 2 hours) in step S116. This is the reason why it is usually better to set approximately 2 hours for the continuous driving time and, when this is beyond 2 hours, a message such as "let's take an earlier rest because of the traffic jam ahead." or the like is displayed in step S117.

When no rest is required in step S116, it is discriminated whether or not the SA is next in step S118. When the SA is next, the necessary fuel amount up to the SA after next is calculated in step S119. In this calculation, the traffic jam information is considered, and the obtained necessary fuel amount is compared With an actual residual fuel amount (+ reserve fuel amount) in step S120. When the residual fuel amount is discriminated to be insufficient as a result of the comparison, a message such as "The next service area is ( (km ahead. Please refuel at the next service area." or the like is displayed in step S121.

As described above, in this embodiment, owing to the information of the SA or the PA after next, information as to whether or not it is necessary or recommended to rest or refuel at the next SA or PA can be supplied. Hence, by using this information, the judging as to whether or not the driver enters the SA or the PA is made easy.

Target Arrival Time and Alternative traffic Information:

In this embodiment, after setting a destination, a user inputs a target arrival time at the destination. On the other hand, the system calculates an estimated arrival time at the destination, in consideration of the traffic jam information and the like, and compares the estimated arrival time with the inputted target arrival time. When the estimated arrival time is later than the target arrival time, information concerning alternative transportation such as railways or the like is supplied, so that the targeted arrival time can be achieved.

Hence, in the system of this embodiment, the CD-ROM 22 stores the information on the normal transportation networks, such as railways (this step excludes networks utilizing roads, such as buses) and information such as coordinates of stations, the presence or absence of station parking places. Average train wait times classified by lines, and the like. Although it is preferable to store all the timetables of the railways in order to be able to supply accurate information, in this instance, in order to reduce the data amount, data such as average speeds classified by lines, service frequency and the like are stored. Hence, the time required when using this usual transportation is expressed in standard time.

Figure 15:
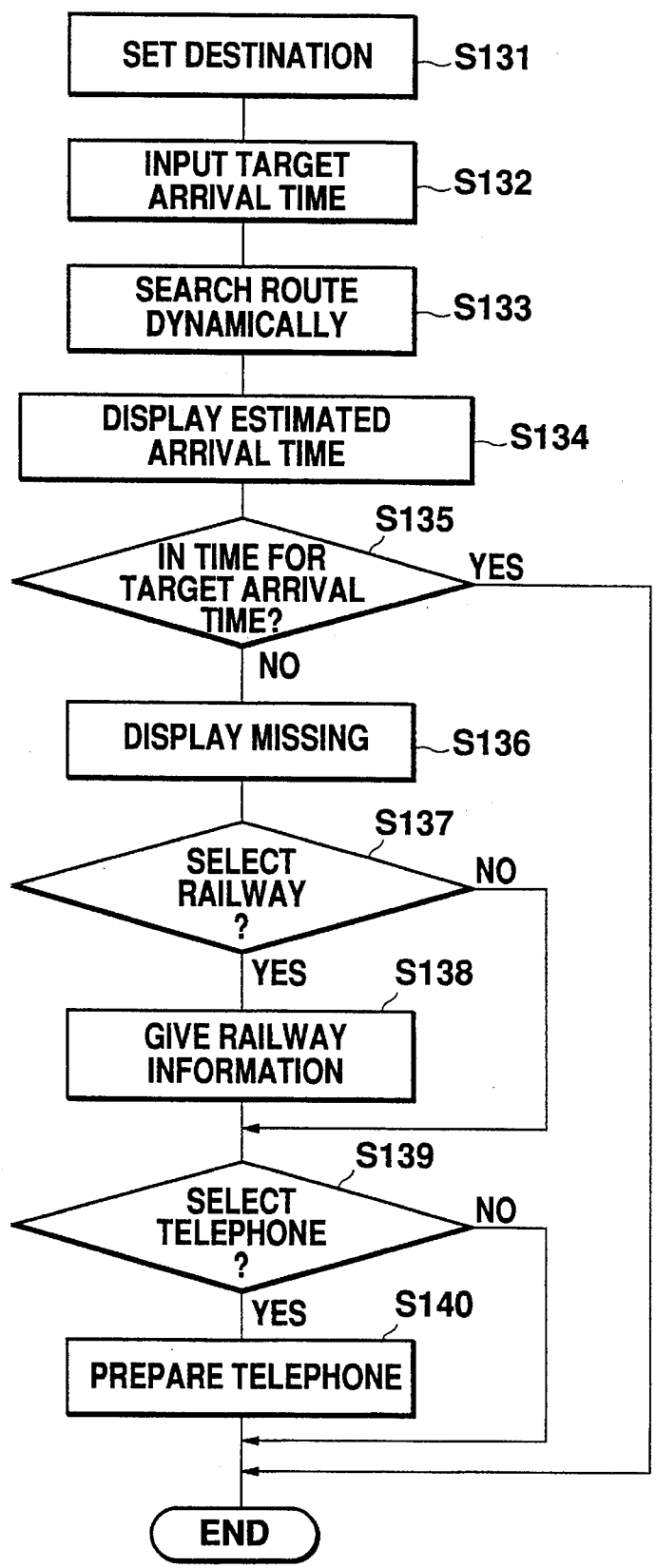
FIG. 15 is a flowchart showing a guidance operation for use in usual transportation according to the present invention.

Next, a guidance operation for use in association with the usual transportation in the system will now be described with reference to FIG. 15. First, the user sets a destination in step S131 and also inputs a target arrival time in step S132. Next, a route search from a present position to the input destination is carried out and this search considers the traffic jam information and searches for reachable routes to the destination which take the shortest time, in step S133.

As a result of the route search, the time needed to reach the destination is estimated, and an estimated arrival time is calculated, and displayed in step S134. Then, the estimated arrival time is compared with the target arrival time to discriminate whether or not it is within the target arrival time in step S135. When it is within the target arrival time, the operation moves to the normal route guidance. In turn, when it is after the targeted arrival time (the estimated arrival time is later than the target arrival time), this fact is displayed in step S136. For example, it is preferable to give a message such as "Under present circumstances, the vehicle will not make the arrival time.". Also, on this occasion, the telephone numbers of the railway and the destination facility are displayed on the display 24.

For instance, when the railway display is touched, the railway is selected in step S137 and the information about the railway is supplied in step S138. When the telephone is selected in step S139, a vehicle telephone is prepared in step S140. That is, a key pad is displayed on the display 24 to prepare for a telephone call which can be made with one touch.

Figure 16:
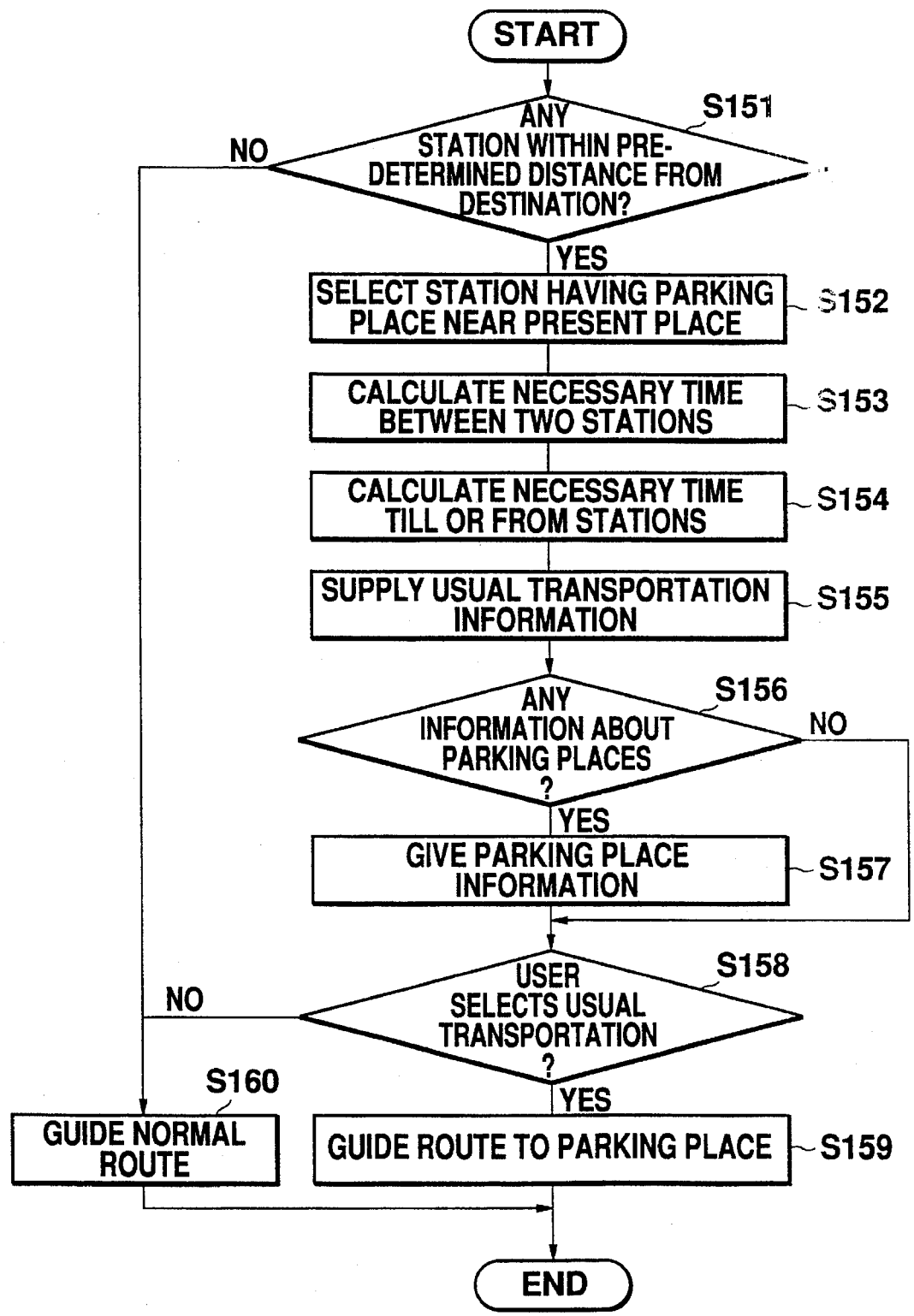
FIG. 16 is a flowchart showing a guidance operation for use in a railway according to the present invention.

Next, processing for the supply of railway information will now be described in connection with FIG. 16. First, it is discriminated whether or not any station is present within a predetermined distance from a destination in step S151. This distance is, for example, 1 km and can be changed depending on the estimated time it will take to reach the destination. When no station is present around the destination, railway guidance his pointless, and thus this processing is finished to move to the normal route guidance in step S160. On the other hand, when at least one station is present around the destination, the station having a parking place near the present position is selected in step S152 and the time it takes to travel between two stations is calculated in step S153. For example, this can be calculated as follows:

Necessary time=Distance/Average speed+Change times×Wait time

Next, the necessary time from the present position to the station near the present position, and from the station near the destination to the destination is calculated in step S154. This calculation, for example, is obtained by summing the necessary time of the driving from the present position to the parking place, the time on foot from the parking place to the station near the present position, and the time on foot from the station near the destination to the destination. Further, in the case of using a taxi, the necessary time can be calculated.

Then, the information in connection with the usual transportation such as the type of transportation, embarking stations, disembarking stations, transit stations and the like is displayed in step S155. Next, it is discriminated whether or not any information about the parking places at the stations is present in, step S156 and, when the information is present, the parking place information such as number of vacant parking places is supplied in step S157. At the same time, the user is asked whether or not he wishes to opt for the usual transportation in step S158.

When the user selects the usual transportation, the driving destination is set to the station parking place and another route guidance is carried out in the same manner as the above route guidance in step S159. On the other hand, when the user does not select the usual transportation, the destination is not changed and the normal route guidance is continued in step S160.

In this embodiment, although the target arrival time is necessarily input, even if no target arrival time is input, when it is found by a route search that a gridlock occurs on the route, whether or not the guidance of the usual transportation such as the railway and the like is required can be automatically displayed. In this case, for example, the ratio of the time it will take to reach the destination by driving and the time it will take using the usual transportation is compared with a predetermined value such as 1:2 and, when the ratio is equal to or less than the predetermined value, the guidance related to the railway cannot be performed. This is because travel using the usual transportation incurs additional cost, and the change of transportation is troublesome, and there is no point in doing it unless a relatively large advantage can be expected. However, the information can be supplied as long as it is desired by the user, even when the expected advantage is not great.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A navigation system to be mounted on a vehicle for carrying out a search of reachable destinations on a basis of map information said navigation system comprising:

reachable final destination estimating means for estimating different reachable final destinations reachable from a present position of said vehicle based on a predetermined condition and said map information; and display means for displaying said estimated different reachable final destinations.

2. The navigation system according to claim 1, wherein:

said predetermined condition in said reachable final destination estimating means is a fixed amount of time; and said display means displays a range reachable in said fixed amount of time from said present position.

3. The navigation system according to claim 1, wherein:

said predetermined condition in said reachable final destination estimating means is an amount of fuel being carried in said vehicle; and said display means displays a range reachable from said present position using said amount of fuel carried in said vehicle.

4. The navigation system according to claim 1, wherein:

said predetermined condition in said reachable final destination estimating means is a classification identifying a specific type of destination.

5. The navigation system according to claim 1, wherein:

said display means displays on a map a range reachable by said vehicle based on said predetermined condition.

6. The navigation system according to claim 1, wherein:

said display means displays on a map a route completable by said vehicle based on said predetermined condition.

7. The navigation system according to claim 5, wherein:

said display means changes a reduction scale of a display map of said range reachable by said vehicle based on a distance from said present position of said vehicle to at least one of said different reachable final destinations.

8. The navigation system according to claim 1, wherein:

said display means displays at least one of said different reachable final destinations determined in an order of reachability.

9. The navigation system according to claim 1, wherein:

said reachable final destination estimating means corrects said estimate of said different reachable final destinations at any time on a basis of dynamic information received while driving.

10. A navigation system to be mounted on a vehicle for carrying out a search of reachable destinations on a basis of map information, said navigation system comprising:

reachable final destination estimating means for estimating different reachable final destinations reachable from a present position of said vehicle under a predetermined condition;

reachable final destination expanding information receiving means for receiving reachable final destination expanding information, and for expanding said estimated different reachable final destinations based on said received reachable destination expanding information and a change of said predetermined condition; and display means for displaying said estimated different reachable final destinations and said received reachable destination expanding information.

11. The navigation system according to claim 10, wherein:

said predetermined condition in said reachable final destination estimating means is time; and said reachable final destination expanding information in said reachable final destination expanding information receiving means is information about a place for resting.

12. The navigation system according to claim 10, wherein:

said predetermined condition in said reachable final destination estimating means is fuel; and said reachable final destination expanding information in said reachable final destination expanding information receiving means is information about a refuel station.

13. The navigation system according to claim 11, wherein:

said different reachable final destinations in said reachable final destination estimating means are corrected at any time on a basis of dynamic information changing at all times while driving.

14. A navigation system to be mounted on a vehicle for carrying out a search of reachable destinations on a basis of map information, said navigation system comprising:

input means for inputting a final destination;

reachable final destination estimating means for estimating different reachable final destinations other than said inputted final destination from a present position of said vehicle, said different reachable final destinations being estimated to be reachable based on a predetermined condition and said map information; and display means for displaying said estimated different reachable final destinations.

15. The navigation system according to claim 14, wherein:

said predetermined condition in said reachable final destination estimating means is a fixed amount of time; and said display means displays a possibility of said vehicle reaching at least one of said different reachable final destinations from said present position of said vehicle in said fixed amount of time.

16. The navigation system according to claim 14, wherein:

said predetermined condition in said reachable final destination estimating means is an amount of fuel being carried in said vehicle; and said display means displays a possibility of said vehicle reaching at least one of different reachable final destinations from said present position of said vehicle using said amount of fuel being carried in said vehicle.

17. The navigation system according to claim 14, wherein:

said different reachable final destinations estimated in said reachable final destination estimating means are corrected at any time on a basis of dynamic information changing at all times while driving.

18. A navigation system to be mounted on a vehicle for carrying out a search of reachable destinations on a basis of map information, said navigation system comprising:

input means for inputting a final destination;

reachable final destination estimating means for estimating different reachable destinations other than said inputted final destination from a present position of said vehicle, said different reachable final destinations being estimated to be reachable under a predetermined condition;

reachable final destination expanding information receiving means for receiving reachable final destination expanding information for expanding said estimated different reachable final destinations based on said reachable final destination expanding information; and display means for displaying said estimated different reachable final destinations and said received reachable final destination expanding information.

19. The navigation system according to claim 18, wherein:
   said predetermined condition in said reachable final destination estimating means is time; and
   said reachable final destination expanding information in said reachable final destination expanding information receiving means is information about alternative transportation.

20. The navigation system according to claim 18, wherein:
   said predetermined condition in said reachable final destination estimating means is fuel; and
   said reachable final destination expanding information in said reachable final destination expanding information receiving means is information about a refuel station.

21. The navigation system according to claim 18, wherein:
   said predetermined condition in said reachable final destination estimating means is fuel; and
   said reachable final destination expanding information in said reachable final destination expanding information receiving means is information about uneconomic driving.

22. The navigation system according to claim 19, wherein:
   said different reachable final destinations in said reachable final destination estimating means are corrected at any time on a basis of dynamic information changing at all times while driving.

* * * * *

REEXAMINATION CERTIFICATE (3471th)

United States Patent [19]

Hirota et al.

[11] B1 5,568,390

[45] Certificate Issued Mar. 31, 1998

[54] NAVIGATION SYSTEM TO BE MOUNTED ON VEHICLES

[75] Inventors: Masaharu Hirota, Susono; Toru Ito, Nagoya; Norikazu Endo, Susono; Akihiko Nojima, Toyota; Yoshitaka Kato, Anjo, all of Japan

[73] Assignee: Toyota Jidosha Kabushiki Kaisha, Toyota, Japan

Reexamination Request:
No. 90/004,610, Apr. 22, 1997

Reexamination Certificate for:
Patent No.: 5,568,390
Issued: Oct. 22, 1996
Appl. No.: 580,491
Filed: Dec. 29, 1995

Related U.S. Application Data

[63] Continuation of Ser. No. 288,211, Aug. 9, 1994, abandoned.

[30] Foreign Application Priority Data

Aug. 10, 1993 [JP] Japan ..................................... 5-198333

[51] Int. Cl.$^6$ ............................................. G06F 165/00
[52] U.S. Cl. .................... 701/201; 340/990; 340/995
[58] Field of Search .................................. 701/200, 201, 701/202, 207, 208, 209, 210, 211, 212; 73/178 R; 340/988, 990, 995

[56] References Cited

U.S. PATENT DOCUMENTS

| 4,926,336 | 5/1990 | Yamada | 340/995 |
|---|---|---|---|
| 4,992,947 | 2/1991 | Nimura et al. | 73/178 R |
| 5,031,104 | 7/1991 | Ikeda et al. | 340/995 |
| 5,084,822 | 1/1992 | Hayami | 340/990 |
| 5,212,643 | 5/1993 | Yoshida | 340/995 |
| 5,220,507 | 6/1993 | Kirson | 340/995 |
| 5,257,023 | 10/1993 | Furuya | 340/995 |
| 5,272,638 | 12/1993 | Martin et al. | 340/995 |
| 5,291,413 | 3/1994 | Tamai et al. | 340/990 |
| 5,369,588 | 11/1994 | Hayami et al. | 340/990 |

FOREIGN PATENT DOCUMENTS

| 0 286 105 | 10/1988 | European Pat. Off. . |
|---|---|---|
| 40 34 681 | 5/1992 | Germany . |
| 63-282879 | 11/1988 | Japan . |
| 2129800 | 5/1990 | Japan . |
| 2278116 | 11/1990 | Japan . |
| 4-213761 | 8/1992 | Japan . |
| 6-125357 | 5/1994 | Japan . |
| 2 250 619 | 6/1992 | United Kingdom . |

OTHER PUBLICATIONS

Tsuzawa, M. and Okamoto, H., "Advanced Mobile Traffic Information and Communication System—AMTICS", *IEEE*, pp. 475–483 (1989).

*Primary Examiner*—Gary Chin

[57] ABSTRACT

A navigation system to be mounted on a vehicle for carrying out a route search and displaying the searched route. Traffic jam information and the like are obtained by an beacon receiver and an input part inputs time as a driving condition. An ECU executes a predetermined calculation based on map data of a CD-ROM and traffic jam data and to obtain a range and routes reachable within the input time and to display the same. In case of residual fuel as a condition, the reachable range by this fuel is displayed. A display of gasoline stands as information for expanding reachability is also executed. Hence, a driver can plan a driving based on these information. Also, a reachable range within 2 hours is displayed and the use of railways is guided when the driver cannot reach the destination within a predetermined time.

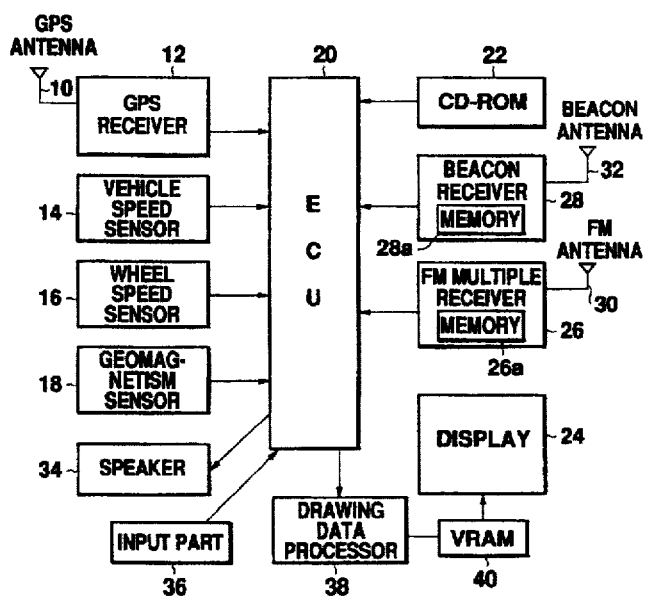

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *